United States Patent

[11] 3,552,432

[72] Inventor William Wagner
 Miami Beach, Fla. (c/o Watsco, Inc., 1800
 W. Fourth Ave., Hialeah, Fla. 33010)
[21] Appl. No. 829,927
[22] Filed June 3, 1969
[45] Patented Jan. 5, 1971

[54] ANTIREFILL SAFETY VALVE
 7 Claims, 11 Drawing Figs.
[52] U.S. Cl..................................................... 137/523,
 220/86, 137/384.2
[51] Int. Cl..................................................... F16k 35/00
[50] Field of Search......................................... 137/523,
 383, 384.2, 384, 384.8, 385; 141/18, 21; 222/3;
 220/86; 251/83

[56] References Cited
UNITED STATES PATENTS
2,077,210 4/1937 Brushe .......................... 220/86

Primary Examiner—M. Cary Nelson
Assistant Examiner—William H. Wright
Attorney—John Cyril Malloy ABSTRACT: A valve for pressure systems having a spring-urged sealing member attached to a threaded handle in which handle movement is controlled by means of a stop after filling of the pressure system which limits retrograde movement of the handle sufficiently to avoid mechanical opening of the sealing member. Sufficient handle movement is retained to reduce the spring bias against the sealing member to below system pressure so that the sealing member is hydraulically opened by that pressure until discharge of system contents and pressure, whereupon the sealing member is spring-closed and cannot be reopened.

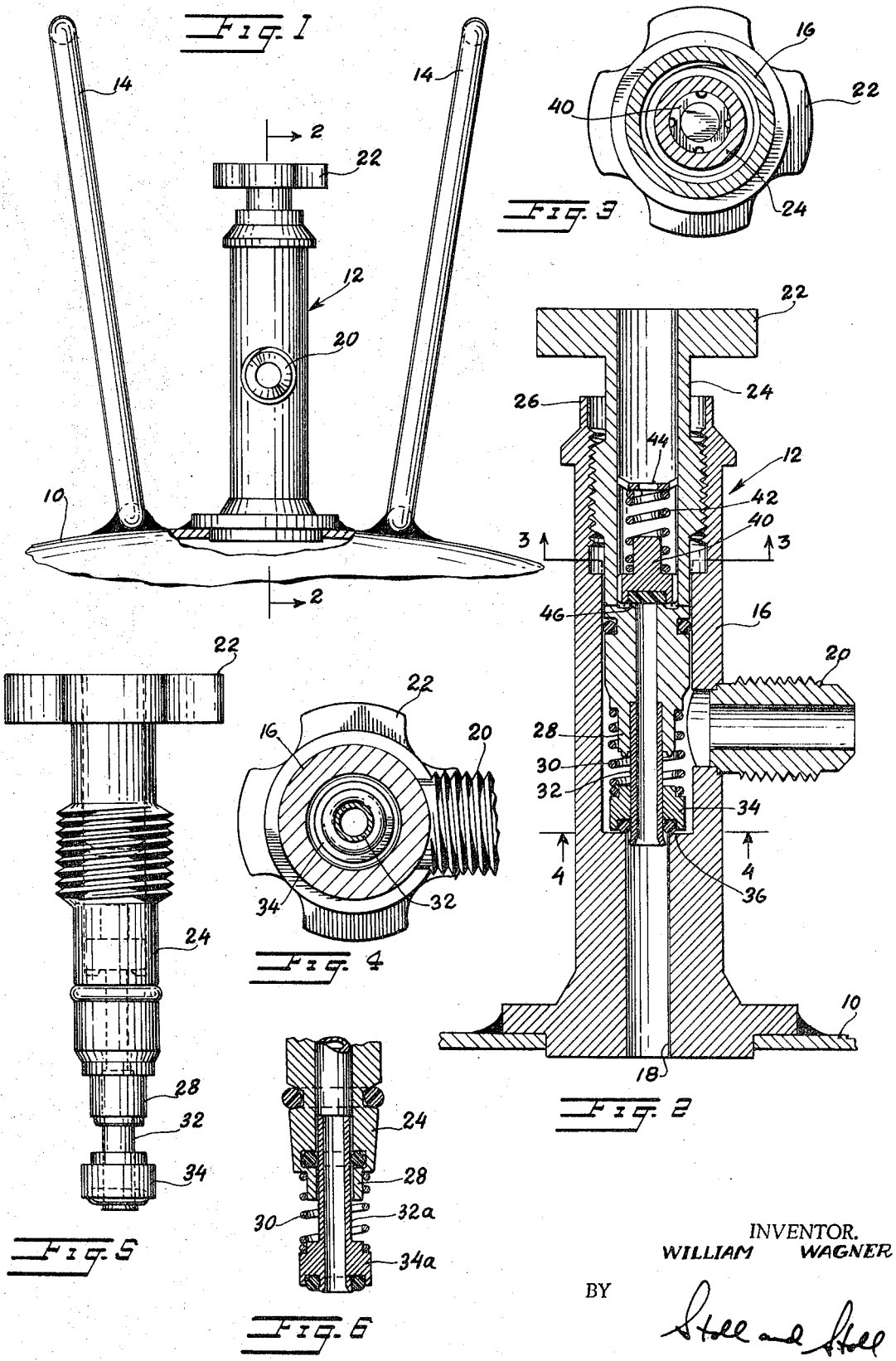

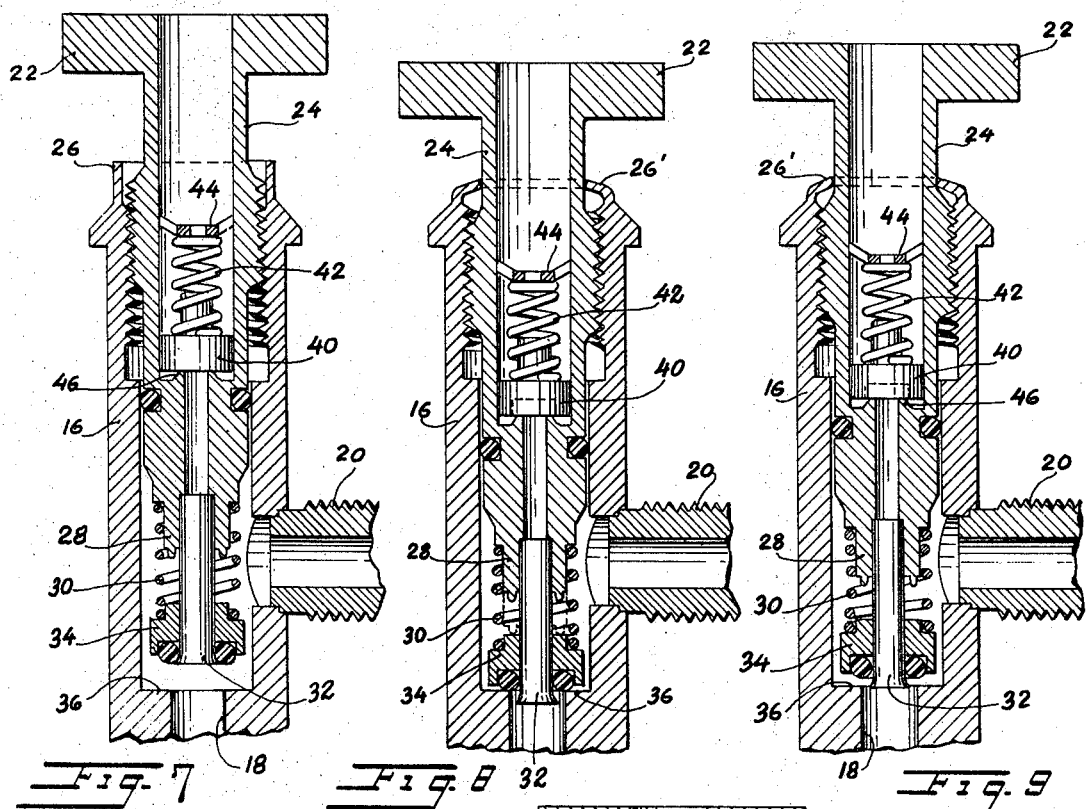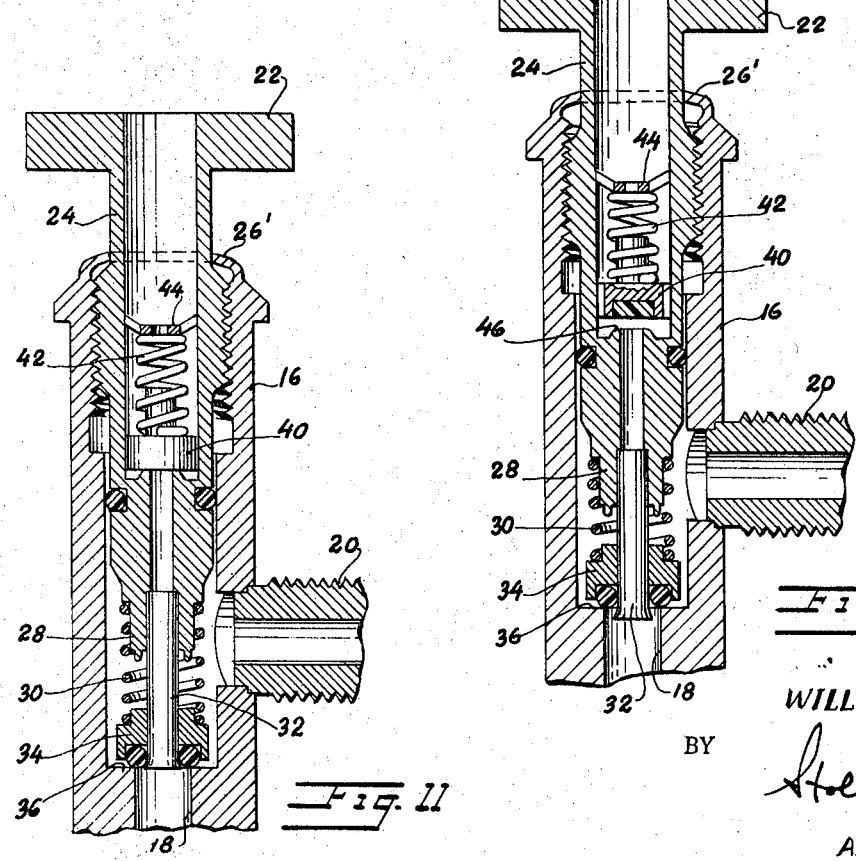

ANTIREFILL SAFETY VALVE

BACKGROUND OF THE INVENTION

1. Field of the Invention
Single-use valves for pressure systems.
2. Description of the Prior Art
Prior hereto, no valve for pressure systems known to applicant has permitted filling of the pressure system, permitted selective emptying or discharging of the pressure system and prohibited refilling of the pressure system.

SUMMARY OF THE INVENTION

Pressure tanks or other vessels are usually filled under carefully controlled conditions at a charging station and then distributed to various places for use. When empty it is intended that the vessel be returned to the charging center for appropriate reuse or destruction in the case of single use containers. Unfortunately, the attractive economies of refilling containers at points of use or otherwise repressurizing them under less than carefully supervised conditions has resulted, in the less consequential cases, in introduction of impurities or inferior refills and, in the more consequential cases, to injurious explosions. The need has long been felt for a valve which would allow normal filling of the pressure vessel under proper conditions, adequate sealing of the pressure vessel during nonuse and effective prevention of improper and unauthorized refilling of the vessel together with evidence of tampering.

Accordingly, the present invention provides a safety valve for pressure systems in which a spring-urged first sealing member is mechanically opened by handle movement to allow filling of the system after which handle movement mechanically closes the first sealing member. Handle movement is now reduced in extent by a stop such as a valve-top collar. Withdrawing the handle to its full limited extent is insufficient to mechanically open the first sealing member but does permit hydraulic opening thereof by system pressure for system emptying. When the system pressure is lowered to a level insufficient to overcome the spring bias, first sealing member is spring-closed and cannot be reopened due to the limited handle travel.

The valve of the present invention provides two notable safety features in addition to the antirefilling function. The first is the nature of the stop which limits handle travel; in a preferred form of the invention the stop is a formable collar at the top of the valve about the handle stem to engage an enlargement on the stem. Tampering with the valve to permit refilling of the pressure system would leave its clearly visible mark in the form of a damaged collar thereby warning prospective users of the system and giving notice of the vandalism. Second, another spring-urged sealing member is provided as a relief for excessive system pressure. This safety valve functions independently of the primary sealing member.

BRIEF DESCRIPTION OF THE DRAWING

FIG. 1 is a fragmentary view of the top of the pressure vessel showing the valve of the present invention mounted thereon between a pair of handles or guards.

FIG. 2 is a cross-sectional view of the valve of the present invention as taken across line 2—2 of FIG. 1.

FIG. 3 is a cross-sectional view taken across line 3—3 of FIG. 2.

FIG. 4 is a cross-sectional view taken across line 4—4 of FIG. 2.

FIG. 5 is a side view of the handle, handle stem and primary sealing member of the valve of the present invention.

FIG. 6 is a fragmentary cross-sectional view of the lower portion of a modified form of the handle stem and primary sealing member.

FIGS. 7—11 show the valve of the present invention in various operating positions in fragmentary cross-sectional view. FIG. 7 shows the valve in its filling position in which the handle is fully withdrawn together with the primary sealing member for purposes of filling the pressure vessel. FIG. 8 shows the valve in its closed position with the collar formed about the handle stem. The locked position of the lower portion of the valve stem is shown in phantom. FIG. 9 shows the valve in its discharging position in which the handle is partially withdrawn, the primary sealing member hydraulically opened. FIG. 10 shows the valve in its closed position with the safety element open. FIG. 11 shows the valve with the handle fully withdrawn to the limit of the collar stop but with the sealing member closed to prevent refilling of the vessel.

DESCRIPTION OF PREFERRED EMBODIMENTS OF THE INVENTION

Pressure vessel or pressure system 10 is provided with antirefill safety valve 12 for filling and selective emptying of the vessel. Valve 12 may be welded to the vessel between the a pair of guards 14 which may also serve as lifting handles. Valve 12 is provided with a housing 16 having a central bore 18 communicating with the interior of vessel 10 and a side port 20 communicating with the bore. A handle 22 having a hollow stem 24 is in threaded engagement with the upper portion of bore 18. The top of housing 16 is provided with a formable flange 26. The lower portion of stem 24 is provided with an annular extension 28 about which is secured the upper end of a compression spring 30 and to which is secured a tubular extension 32 extending downwardly to a flared bottom. Riding tube 32 is primary sealing member 34 which is biased by the lower end of spring 30 against a seat 36 formed in bore 18. The flare at the end of tube 32 prevents removal of primary sealing member 34. In a modified form of the invention as shown in FIG. 6, primary sealing member 34a is an integral lower extension of tube 32a and no flare is necessary except as may be used to secure a sealing washer. Either form, tube or extension, constitutes connecting means between the primary sealing member and the tube for mechanical opening of the sealing member by retrograde movement of the handle. The connecting means is a slide for the sealing member.

Bore 18, the interior of tube 32 and the interior of hollow stem 24 communicate between the interior of vessel 10 and the atmosphere except as may be closed by a secondary safety valve located in stem 24. The secondary valve comprises a secondary sealing member 40 and is biased against vessel pressure by secondary spring 42 which is located at its other end by a crossmember 44. Secondary sealing member 40 seals against a seat 46 formed in stem 24 by a reduction in the bore diameter thereof.

OPERATION OF PREFERRED EMBODIMENTS OF THE INVENTION

In order to fill vessel 10, handle 22 is withdrawn sufficiently to permit unseating of primary sealing member 34 by longitudinally pulling it away from seat 36 by tube 32. See FIG. 7. When the vessel is filled, handle 22 is advanced until primary sealing member 34 is in sealing contact with seat 36 under sufficient pressure of spring 30 to overcome the pressure in the vessel.

If it is desired to firmly lock primary sealing member 34 against this seat, handle 22 is merely advanced sufficiently to cause annular extension 28 to bear against primary sealing member 34 and hold it in sealed position; this is shown by the dotted lines at the bottom of FIG. 8.

Flange 26, which until now had permitted unlimited withdrawal of stem 24 and handle 22 from housing 16 is now cramped or otherwise formed about stem 24 to form collar or stop 26' which engages an enlargement on stem 24 to form limit retrograde movement of handle 22 and stem 24 outwardly of housing 16. For convenience, that enlargement may also be provided with the threads of the stem.

Handle 22 may now be withdrawn only to the extent shown in FIG. 11; that is, only until the stop engages the stem enlargement. This full limited retrograde movement is not sufficient to mechanically raise primary sealing member 34 from seat 36. Sufficient pressure in vessel 10 to hydraulically raise primary sealing member 34 above seat 36 against spring 30 will permit discharge of vessel contents through port 20 as may be seen in FIG. 9. There is no way to raise primary sealing member 34 short of destruction of the valve in general and stop 26' in particular.

It will accordingly be seen that the valve of the present invention permits initial filling of the vessel but, after engagement of stop 26', does not permit refilling of the vessel for the reason that primary sealing member 34 cannot be opened except by pressure internal of the vessel.

When primary sealing member 34 is closed and pressure in the vessel rises to an unsafe extent, secondary sealing member 40 is opened and the pressure allowed to escape to the atmosphere. The critical pressure at which secondary sealing member 40 opens is determined by the strength of secondary spring 42. Generally speaking, however, it is preferable that the strength of spring 30 be greater than that of secondary spring 42 when handle 22 is closed as shown in FIG. 10 and that the strength of spring 30 be less than that of secondary spring 42 when handle 22 is opened to its full limited position as shown in FIG. 11. The purpose of these relative spring strengths, of course, is to regulate which sealing member, primary or secondary, is to open and which is not to open under particular conditions. Thus, when it is desired to empty the contents of the vessel through port 20, primary sealing member 34 should open and secondary sealing member 40 should not, see FIG. 9. On the other hand, automatic venting of unsafe vessel pressure should be through handle 22 to the atmosphere and not through port 20 and to whatever system that port may connect. The proper condition is shown in FIG. 10 wherein the vessel pressure is sufficient to open secondary sealing member 40 but insufficient to open primary sealing member 34. The variations in strength of spring 30 are determined by the longitudinal position of handle 22 whereby spring 30 is compressed to a greater or lesser extent. Of course, when handle 22 is in its locked position such as shown in phantom in FIG. 8, the strength of spring 30 relative to that of secondary spring 42 is unimportant for the reason that annular extension 28 bears directly against sealing member 34 and locks the latter in closed position.

Modifications in the foregoing may readily be provided. For example, the stop necessary to limit retrograde movement of handle 22 may be either a continuous or interrupted annular flange.

I claim:
1. A valve for a pressure system, comprising:
 a. a housing providing communication between a port and the pressure system for charging and discharging the latter;
 b. a handle, including a stem portion, in threaded engagement with said housing;
 c. a spring-urged sealing member for closing and opening communication between said port and said system, said sealing member being mounted for mechanical movement by said handle and for hydraulic movement by system pressure against spring bias; and
 d. engageable stop means for limiting retrograde handle movement to below that required for mechanical opening of said sealing member.

2. A valve for a pressure system in accordance with claim 1, wherein said engageable stop means is selectively engageable with said handle.

3. A valve for a pressure system in accordance with claim 1, additionally comprising connecting means to connect between said sealing member and said handle for mechanical opening of said sealing member by said handle.

4. A valve for a pressure system in accordance with claim 3, wherein:
 a. said connecting means comprises a slide for said sealing member joined at one end to said handle for movement therewith and having an enlargement at its other end to prevent removal of said sealing member; and
 b. the spring of said sealing member bears outwardly between said handle and said sealing member.

5. A valve for a pressure system in accordance with claim 1, wherein said engageable stop means comprises a formable flange.

6. A valve for a pressure system in accordance with claim 1, wherein said engageable stop means comprises a formable extension of said housing.

7. A valve for a pressure system in accordance with claim 1, wherein said engageable stop means comprises a collar formed about said stem for engagement therewith.